United States Patent [19]
Tilly et al.

[11] Patent Number: 5,558,386
[45] Date of Patent: Sep. 24, 1996

[54] ASYMMETRICAL WIRE HOOK LATCH ARRANGEMENT

[75] Inventors: Lynn K. Tilly, Oxford; Donald L. Silsbe, Woodhaven; Michael T. Twomley, Linden, all of Mich.

[73] Assignee: Chrysler Corporation, Highland Park, Mich.

[21] Appl. No.: 425,545

[22] Filed: Apr. 20, 1995

[51] Int. Cl.⁶ ........................................ B60N 2/02
[52] U.S. Cl. .................. 296/65.1; 292/80; 292/111; 297/336
[58] Field of Search ............ 296/65.1, 63; 292/80, 292/101, 111; 297/331, 335, 336

[56] References Cited

U.S. PATENT DOCUMENTS

| | | | |
|---|---|---|---|
| 1,717,336 | 6/1929 | Grim . | |
| 2,153,155 | 4/1939 | Page et al. | 297/331 X |
| 3,328,069 | 6/1967 | Dumas | 296/65 |
| 3,550,949 | 12/1970 | Bonnaud | 296/69 |
| 3,712,653 | 1/1973 | Lehmann | 292/111 X |
| 3,807,790 | 4/1974 | Erard | 296/66 |
| 4,026,332 | 5/1977 | Werdelin et al. | 140/93 |
| 4,475,763 | 10/1984 | Hamatani et al. | 296/65.1 |
| 4,475,769 | 10/1984 | Crawford et al. | 297/331 |
| 4,512,609 | 4/1985 | Pärsson | 297/331 |
| 4,606,577 | 8/1986 | Hirama et al. | 297/331 |
| 4,700,989 | 10/1987 | Ercilla | 297/331 |
| 4,892,342 | 1/1990 | Newman et al. | 292/347 |
| 5,038,437 | 8/1991 | Russell et al. | 16/266 |
| 5,133,589 | 7/1992 | Kimura | 297/335 |
| 5,328,243 | 7/1994 | Akiyama | 297/378.12 |
| 5,346,190 | 9/1994 | Dabney | 267/95 |

*Primary Examiner*—David M. Mitchell
*Assistant Examiner*—Kia M. Robinson
*Attorney, Agent, or Firm*—Thomas G. Pasternak

[57] ABSTRACT

An improved asymmetric wire-hook for a closure one-piece latch wire retainer pivotally mounted to a hinged member wherein the hook is latched upon rotation through an elongated slot of an anchor member. The retainer includes axially aligned wire-lengths terminating in spaced apart opposed bend portions interconnected by the wire-hook. The wire-hook includes one end of a long finger connected to one bend portion and sloped downwardly at a predetermined obtuse-angle relative to one wire length and a short finger connected to the other bend portion and extending downwardly at a right angle relative to the remaining wire length. The long finger lower end terminates in a first acute-angled bend juncture connected to a proximate end of a single lead-in wire segment upwardly sloped at a relatively steep incline while the short finger lower end terminates in a second acute-angle bend juncture connected to a proximate end of a single lead-out wire segment upwardly sloped at a relatively flat incline. The single lead-in and lead-out segments minimizing frictional drag thereby reducing operator effort during closure latching and unlatching with the anchor member slot while the lead-out segment obviates hang-up with a downturned lip defining the slot upper edge.

6 Claims, 6 Drawing Sheets

ASYMMETRICAL WIRE HOOK LATCH ARRANGEMENT

BACKGROUND OF THE INVENTION

This invention relates to vehicle seating structures and more particularly to an improved wire-hook latch arrangement for a vehicle rear seat cushion adapted for forwardly folding movement about a seat hinge arrangement from a substantially horizontal latched mode to an overcenter unlatched mode.

The U.S. Pat. No. 5,038,437 issued Aug. 13, 1991 to Russell et al. discloses a folding seat hinge arrangement of the general type used to pivotally mount a rear seat cushion on a vehicle floor between a rearwardly folded regular seating mode and a forwardly folded position providing access to under seat storage.

SUMMARY OF THE INVENTION

It is a feature of the present invention to provide an improved asymmetrically formed wire-hook for a one-piece latch wire retainer pivotally supported on a seat cushion support pan. The wire-hook, formed integral with the wire latch retainer, is adapted for ready wire-hook latching reception in a slot of an upstanding floor mounted sheet metal latch anchor as the seat cushion is rotated downwardly to its use position. A downturned lip extends transversely along the anchor slot upper edge providing needed stiffening of the slot. The lip, however, has the undesired tendency to hang-up a "tip" portion of a currently used symmetrically formed wire-hook. The "tip" portion is in the form of a transversely extending wire bight segment which trails the wire-hook during disengagement and leads the wire-hook during engagement.

It is another feature of the invention to provide an improved wire-hook as set forth above wherein a transverse bight segment has its one outboard end connected to a distal upper end of a single lead-in wire segment, disposed at a relatively steep ramp angle, and its other outboard end connected to a distal upper end of a single lead-out wire segment disposed at a relatively flat ramp angle.

The seat cushion is unlatched by lifting upward on a seat cushion pull-strap causing the wire-hook to rotate about the axis of the latch wire retainer. As the pull-strap induced rotation moves the hook rearward through the latch anchor slot, the wire-hook trailing bight segment is urged into sliding engagement with an undersurface of the anchor top wall toward the downturned lip. The wire-hook single lead-out wire segment, by virtue of being disposed at the flat ramp angle, cams the hook over the lip free edge with minimal frictional drag. Also, as the lead-out wire segment thereafter smoothly transfers the bight segment tip into sliding contact with the lip free edge by means of its one inboard bend portion, the lead-out segment obviates hang-up with the anchor slot lip.

Still another feature of the present invention results in improved engagement of the wire-hook. The single lead-in wire segment, formed at a relatively steep ramp angle, minimizes frictional contact during engagement with the upper horizontal surface of the anchor top wall. The lead-in segment has an additional feature in that it assists the latch wire retainer torsional spring in rotating the hook into engagement with the anchor slot. That is, by virtue of the hook having only a single lead-in wire segment, its inboard bend connection is adapted to readily cam the hook bight segment past the downturned lip further reducing operator effort during engagement.

To accomplish these and other objectives and features, the vehicle rear seat cushion is adapted for ready unlatching and forward pivoting about hinges to an overcenter stored position providing access to an under seat storage area. Upon the seat cushion being folded rearwardly from its forwardly tipped underseat access position to its seating position it is latched securely to the floor anchor. A latch wire retainer, including the wire-hook, is pivotally supported on the seat cushion support pan for spring biased releasable engagement with the floor mounted anchor member elongated slot thereby locking the cushion to the vehicle floor. Disengaging the seat cushion latch wire retainer from its hook latched position is accomplished by pulling up on a seat latch release pull strap fixed to one looped end of the latch wire retainer.

Figures 5A, 5B, 5C, 5D:
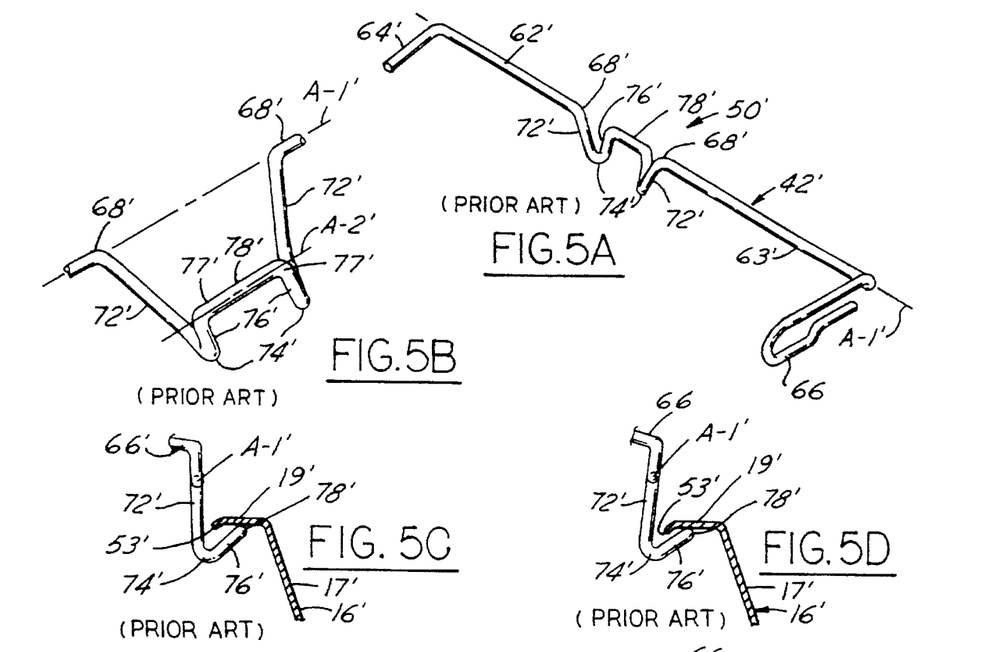
FIG. 5A is a perspective view of a prior art one-piece latch wire retainer.
FIG. 5B is a fragmentary enlarged perspective view of the prior art wire-hook.
FIGS. 5C–5F is a series of fragmentary side views, partly in cross-section, of the un-latching sequence of the prior art wire-hook.
Figure 5E:
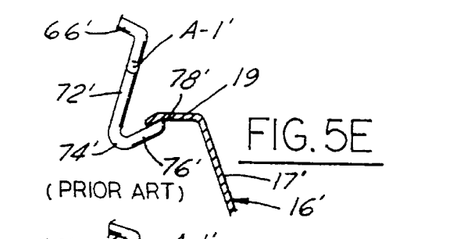
Figure 5F:
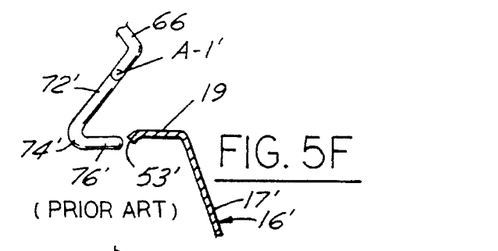
Figure 5G:
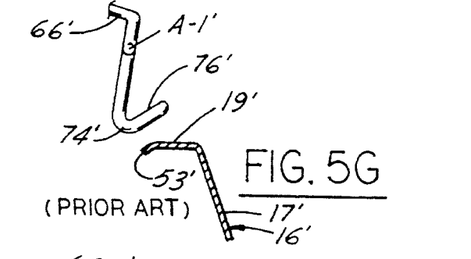
FIGS. 5G–5J is a series of fragmentary side views partly in cross-section showing the latching sequence of the prior art wire-hook.

With reference to prior art FIG. 5A the conventional one-piece latch-wire retainer is shown in detail at 42' comprising an inboard first wire length 62' and an outboard second wire length 63' aligned on common pivot axis of rotation A1'. The wire length 62' terminates at its one inboard end in a right-angle rearwardly extending connector length 64' while length 63' terminates in a rearwardly extending pull-strap open loop 66'. As seen in FIG. 5B, the wire lengths 62' and 63' are formed with opposed mirror image obtuse-angle bends 68'—68' defining an intermediate symmetrical latch wire-hook 50'. The wire-hook 50' is defined by a pair of mirror image converging fingers 72'—72' which lie in a first common plane. The distal end of each converging finger 72' is connected by equal acute-angle bends 74'—74' to one of a pair of parallel longitudinally spaced mirror image wire segments 76'—76' which lie in a second common plane. The pair of segments 76'—76' are interconnected by bend portions 77—77 to a bight segment 78' defining a second axis A-2' parallel to the axes A-1'.

In prior art FIG. 5C there is shown the relationship of the wire-hook 50' to a floor mounted latch anchor member 16' when the vehicle seat cushion is in its latched position. The wire-hook 50' is adapted for unlatching rotation about the axis A-1' by pulling upward on a seat release pull-strap attached to the retainer open loop 66'. A torsional spring, which encircles the retainer length 63', has one spring end reacting against the seat cushion support pan and its other end reacting against the wire-hook 50' (FIG. 5C) thereby biasing the hook 50' counter-clockwise into latched engagement.

The prior art FIGS. 5C through 5F show the sequence of motion of the wire-hook 50' relative to the anchor member 16' during disengagement-engagement of the seat latch. It will be noted in FIGS. 5D and 5E that as the top of the wire-hook bight segment 78' slides along the undersurface of anchor top wall 19' bight segment 78' has a tendency to hang up on the anchor slot downturned lip free edge 53'.

Figure 5H:
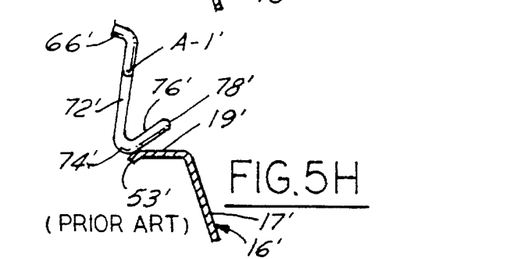
Figure 5I:
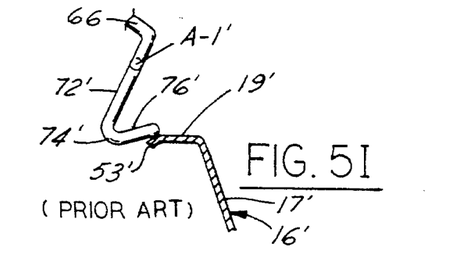
Figure 5J:
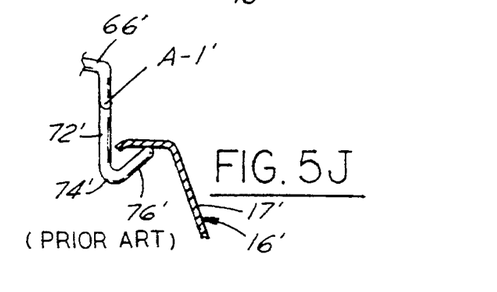

The prior art FIGS. 5G through 5J show the sequence of motion during wire-hook engagement. As the seat cushion is pivoted downward, the bottom edge points of the wire-hook segments 76'—76' contact the face of anchor top wall 19' at a relatively flat ramp angle as seen in FIG. 5H. FIG. 5I shows the wire-hook 50' swinging away from the anchor. Once the wire-hook 50' has cleared the lip free edge 53' the torsional spring snaps the hook 50' back in a forward direction wherein bight segment 78' is urged into contact with the undersurface of the anchor top wall 19' (FIG. 5J). The design of the prior art wire-hook 70' causes objectional operator effort between the wire segments 76'—76' and the anchor member top wall upper surface during latching, and hang up of the wire-bight segment 50' with the anchor slot downturned lip free edge 53' during unlatching.

BRIEF DESCRIPTION OF THE DRAWINGS

These and other objects, features and advantages of the present invention will appear from the following written description and the accompanying drawings in which.

DETAILED DESCRIPTION OF THE PREFERRED EMBODIMENT

Figure 1:
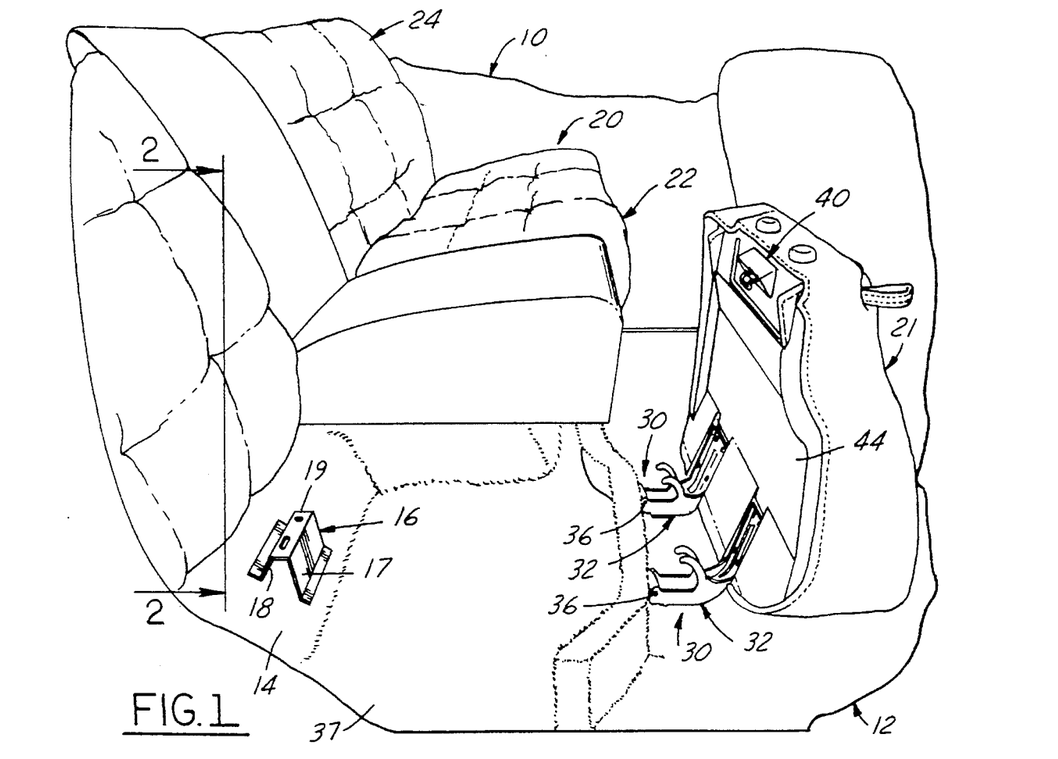
FIG. 1 is a fragmentary perspective view of a vehicle interior showing a rear seat cushion tipped forwardly by a pair of separable hinge assemblies providing under seat storage access.
Figure 2:
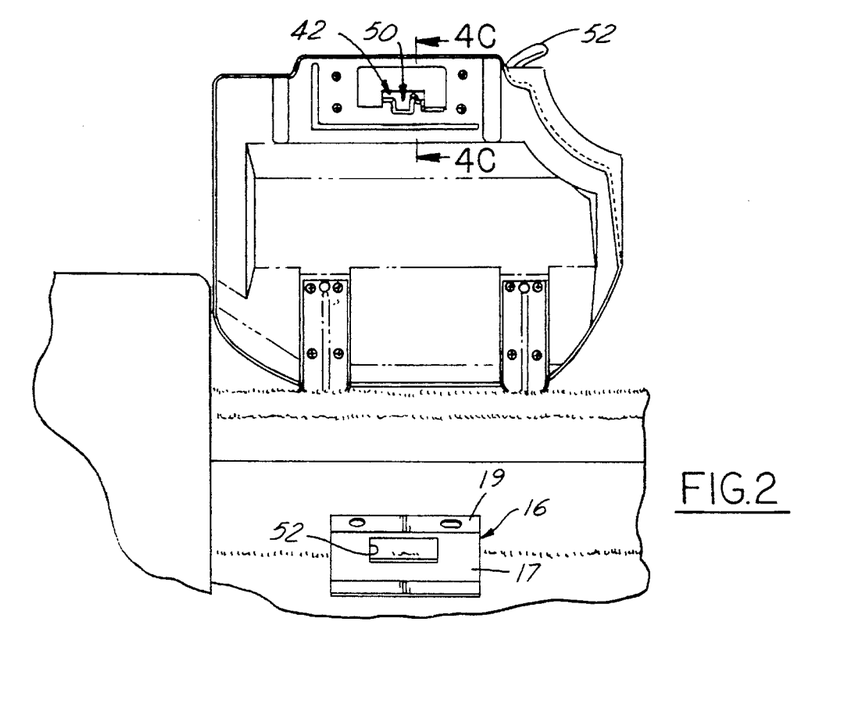
FIG. 2 is a fragmentary elevation view looking forwardly from a transverse vertical plane, denoted by line 2—2 in FIG. 1, at the underside of the forwardly tipped rear seat cushion showing the improved wire-hook.

Turning now to the drawings and more particularly to FIG. 1, a vehicle 10 includes a floor pan 12 having rear transverse kickup tunnel defined by a rearwardly sloped footwall 14. The foot wall supports a anchor member 16 defining rearwardly and forwardly angled transversely extending plates 17 and 18 joined by a horizontal top plate 19. A vehicle rear seat structure 20 includes a right and left side seat cushions 21 and 22 respectively, and a seat back 24 of conventional structure. The right side seat cushion 21 is shown unlatched and forwardly pivoted about a pair of separable hinge assemblies 30 for under seat storage access.

Figure 3:
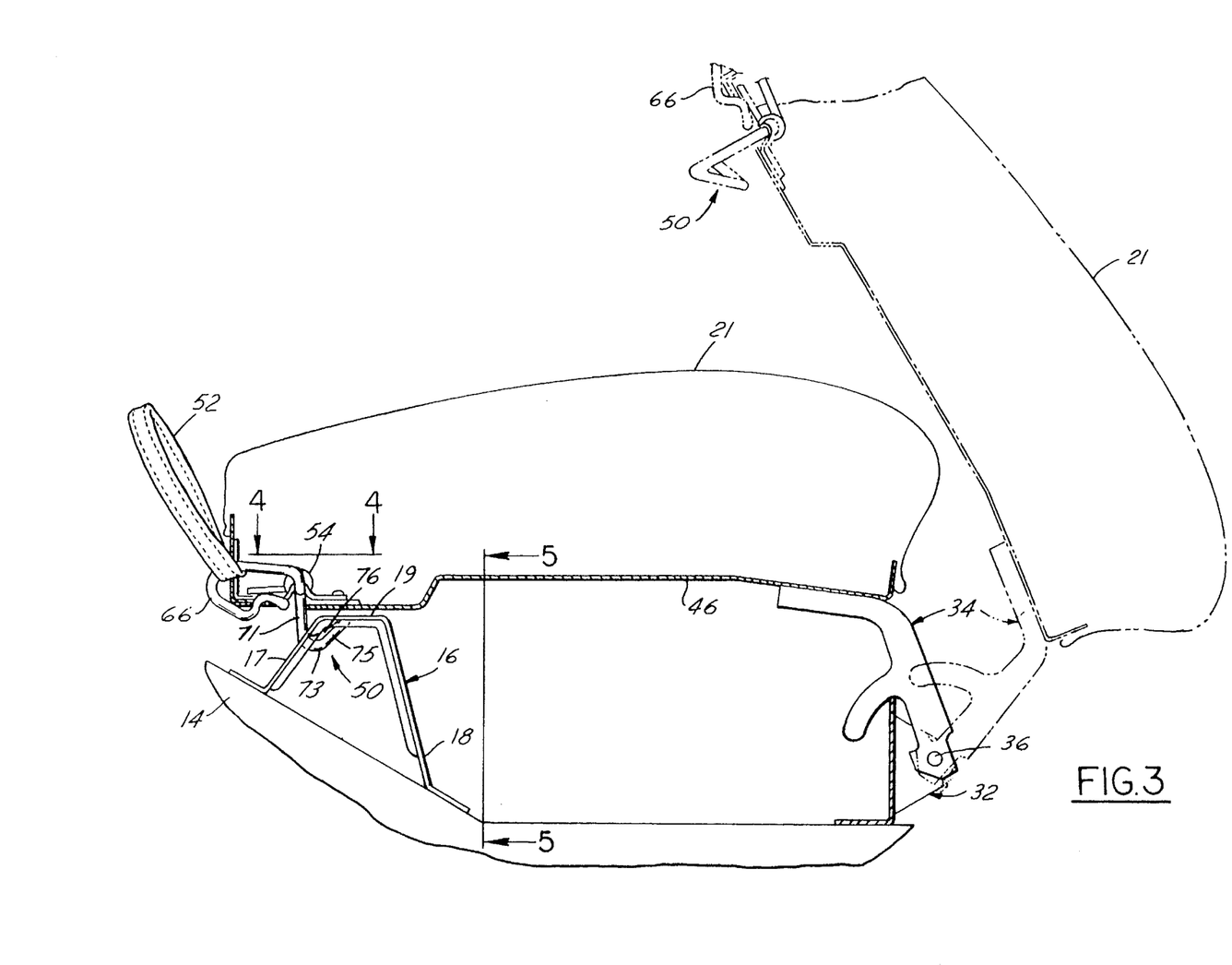
FIG. 3 is a fragmentary side elevational view, partly in section, showing the rear seat cushion of FIG. 1 in its normal seating mode with the improved wire-hook in its latched condition.

As seen in FIG. 3, each hinge assembly comprises a body mounting or body-half hinge plate 32, and a seat cushion mounting or seat-half hinge plate 34, pivotally mounting the forward section of the seat cushion 21 to the vehicle floor pan 14. The seat cushion 21 is thus movable about hinge pins 36 from its solid line horizontal seating or use position to its dashed line forwardly pivoted overcenter folded position providing access to an under seat storage area 37. For a detailed description of the hinge assemblies 30 reference may be made to U.S. Pat. No. 5,038,437 the disclosure of which is incorporated by reference herein.

Figure 6:
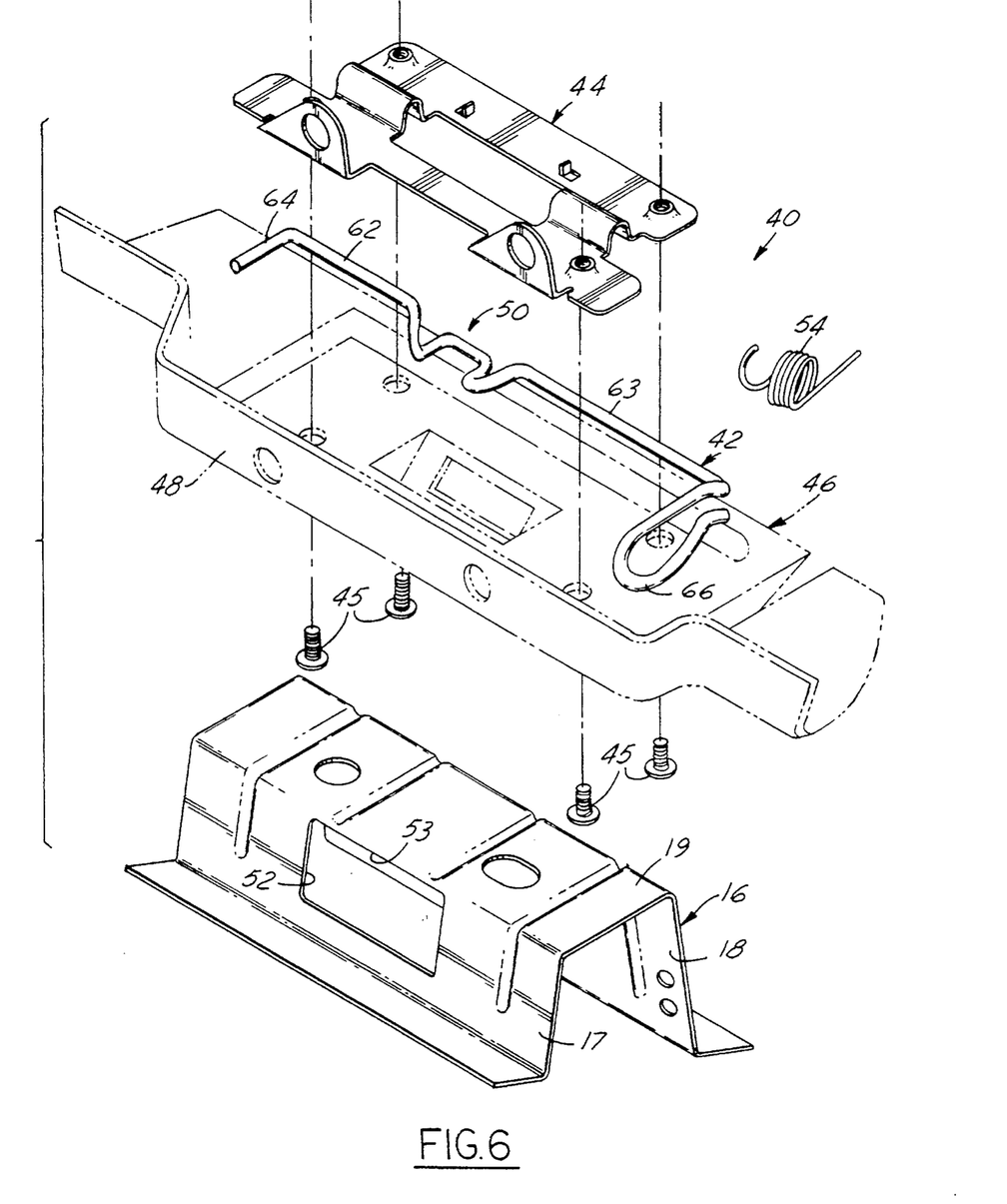
FIG. 6 is an enlarged exploded perspective view of a seat latching assembly and floor anchor with the wire-hook of the present invention.
Figure 7:
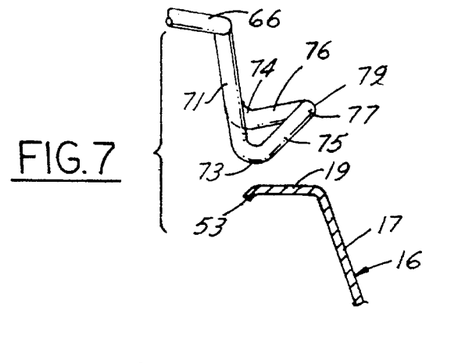
FIGS. 7, 8, 9 and 10 are a series of fragmentary side views, partly in cross-section of the latching sequence of the wire-hook of the present invention.

The seat cushion 21 is adapted for rearward folding from its overcenter tipped position of FIG. 1 to its seating position, shown in solid lines in FIG. 3, wherein the seat cushion is latched securely to the floor anchor member 16 by a conventional latching arrangement shown in FIG. 6. As seen in FIG. 6, the latching arrangement includes a seat cushion latch assembly 40 and associated floor latch anchor 16.

Figure 4:
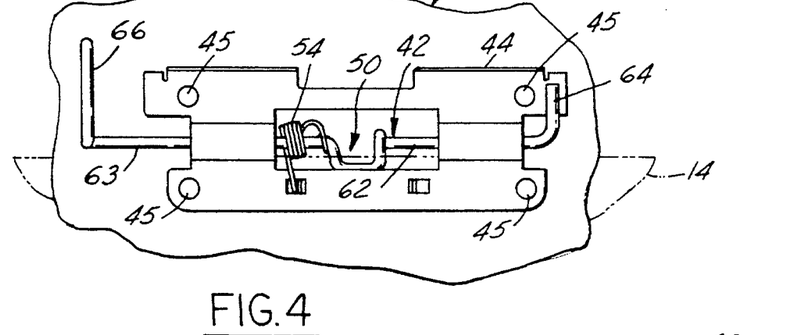
FIG. 4 is a fragmentary plane view taken on the line 4—4 of FIG. 3 showing the improved wire-hook in its latched condition.
Figures 4A, 4B, 4C, 4D, 5:
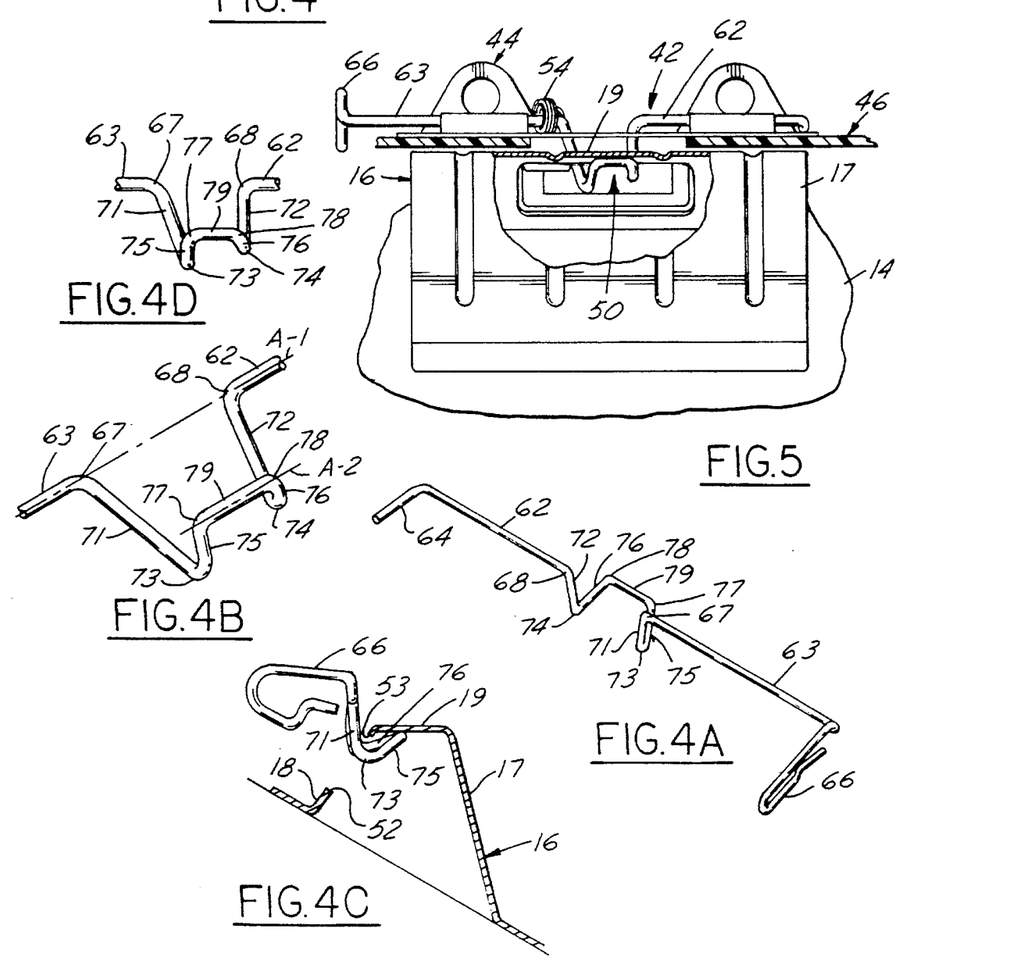
FIG. 4A is a detail perspective view of the one-piece latch wire-form.
FIG. 4B is a fragmentary enlarged perspective view of the wire-hook of the present invention.
FIG. 4C is a fragmentary vertical cross sectional view taken on the line 4C—4C of FIG. 2.
FIG. 4D is an enlarged fragmentary front view of the wire-hook of FIG. 4B.
FIG. 5 is a fragmentary plane view taken along line 5—5 of FIG. 3 showing the improved wire-hook in its latched condition.

The latch assembly 40, shown in FIGS. 4 and 5, comprises a one-piece latch wire retainer 42 pivotally retained by mounting plate 44 upon the plate being secured by bolts 45 to an underside interior surface of seat cushion support pan 46 adjacent pan aft upstanding flange 48 (FIG. 6). The latch wire retainer 42, has an improved wire-hook 50 adapted for spring biased snap-action engagement with a floor anchor rectangular-shaped elongated latch slot 52 in the anchor aft wall 18 in a manner to be explained. It will be noted in FIG. 4C that the anchor slot 52 has a downturned lip defining upper transversely extending slot lip free edge 53. The anchor member downturned lip provides needed strength to the sheet metal anchor member slotted aft wall 17.

The latch assembly one-piece latch wire retainer 42 comprises an axially inboard extending wire length 62 and an axially outboard extending wire length 63 aligned on a first common latch pivot axis A-1. The inboard wire length 62 terminates at its one end in a right-angle rearwardly extending connector 64 while the outboard wire length 63 terminates in a rearwardly extending pull-strap open loop 66.

With reference to FIGS. 4A and 4B the outboard wire length 63 is shown formed with an obtuse-angle bend portion 67 while the inboard wire length 62 is formed with an opposed right-angle bend 68. The axially opposed spaced apart obtuse-angle bend 67 and right-angled bend portion 68 define an improved asymmetric-shaped wire-hook 50 therebetween. The wire-hook 50 comprises a long finger 71 having one end connected to the bend portion 67 and sloped downwardly and inwardly at a predetermined obtuse-angle of the order of 130 degrees, relative to the wire-length 63. A downwardly extending short finger 72 has one end connected to the bend portion 68 and defines a right-angle bond relative to the wire-length 62.

It will be noted in FIG. 4B that the long finger 71 terminates at its other end in a first acute-angle bend juncture 73 of the order of 50 degrees relative to the long finger 71. The short finger 72 terminates at its other end in a second acute-angle bend juncture 74 of the order of 80 degrees relative to the short finger 72. The bend juncture 73 is connected to a proximate end of a lead-in guide wire segment 75 upwardly sloped at a relatively steep incline or ramp angle which controls engagement of the wire-hook (FIGS. 7–10). The bend juncture 74 is connected to a proximate end of a lead-out guide wire segment 76 upwardly sloped at a relatively flat incline or ramp angle which controls disengagement of the wire-hook (FIGS. 11–14). The lead-in engagement wire segment 75 and the lead-out disengagement wire segment 76 are shown in FIGS. 4B and 4D with their upper end bend portions 77 and 78 interconnected by a bight segment 79 defining a transverse bight axis A-2 parallel to the retainer pivot axis A-1.

Figure 8:
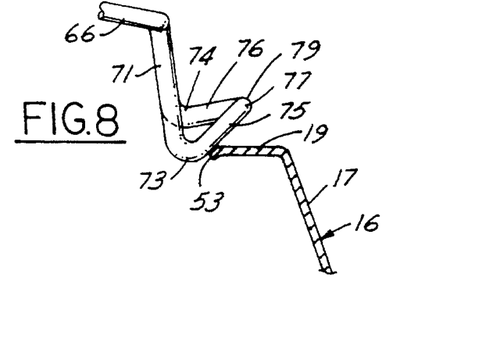
Figure 9:
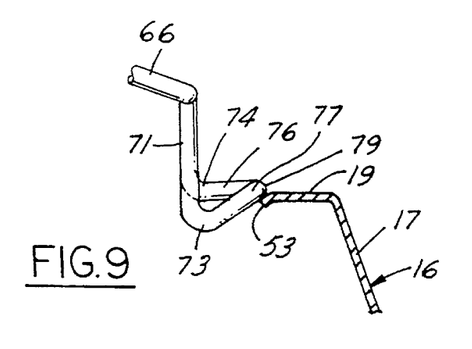
Figure 10:
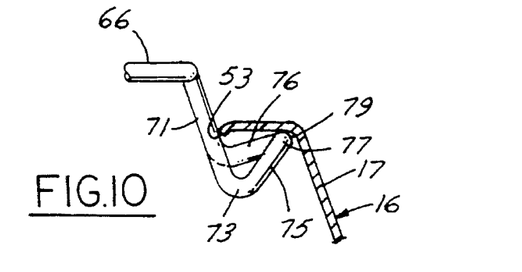

With reference to FIG. 8 it will be noted that during engagement of the wire-hook 50 the single lead-in segment 75 bottom edge engages the slot downturned lip at a steep ramp-angle thereby enabling the bight wire segment 79 to readily cam past the lip free edge 53. Further, as seen in FIG. 9, by camming the wire-hook 50 single rounded end bend portion 77 over lip free edge 53 applicants' asymmetric wire-hook design minimizes frictional drag. This reduces latching effort while obviating hang up between the hook bight segment 79 and the anchor slot downturned lip.

Figure 11:
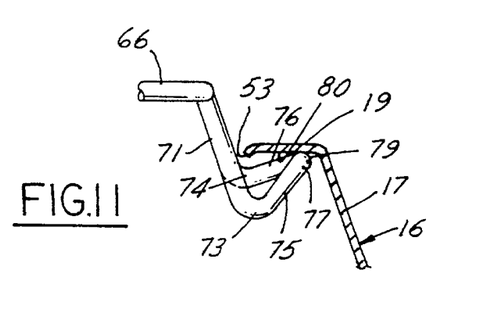
FIGS. 11, 12, 13 and 14 are a series of fragmentary side views, partly in cross-section, of the unlatching sequence of the wire-hook of the present invention.
Figure 12:
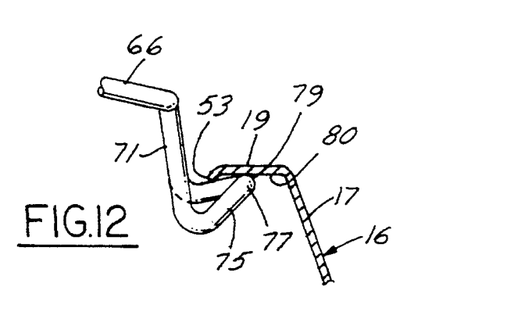

With reference to FIGS. 11 and 12 it will be seen that during disengagement of the wire-hook 50 the lead-out segment 76 provides a single upper edge relatively flat ramp angle so as to readily cam the bight segment 78 over the anchor lip free-edge 53. In a similar manner to hook engagement, applicants' design insures less frictional drag on the hook during disengagement. This is to be contrasted with the prior art symmetrical wire-hook 50' involving dual wire segments 76'—76' and dual bend portions 77' adapted to engage the anchor lip free-edge 53.

Figure 13:
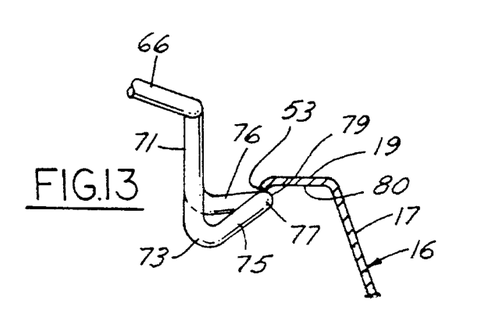
Figure 14:
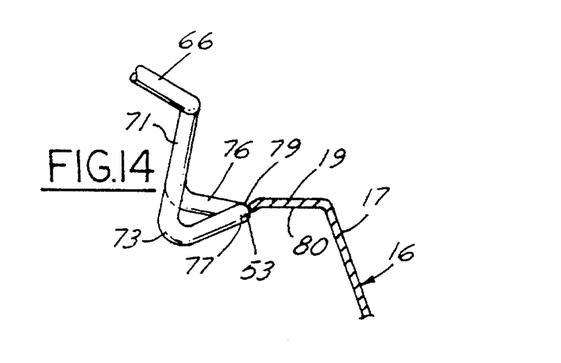

Thus, as seen in FIG. 12, as the pull strap 52 is lifted the upper edge of the wire-hook bight segment 79 slides along the anchor upper wall undersurface 80 because of the relatively flat ramp angle of the single lead-out segment 76. Upon reaching the lip free edge 53, as seen in FIG. 13, the single rounded bend portion 78 engages the lip free edge 53 slidably camming the bight segment 79 past the edge 53 thereby obviating any hang up condition with the downturned lip.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A one-piece latch wire retainer having first and second wire lengths defining a common axis of rotation and terminating in opposed spaced apart first and second bend portions interconnected by a wire-hook, said wire-hook adapted for latching and unlatching a hinged member pivotable about a transverse hinge axis with a fixed anchor member wire-hook engaging slot, an improved wire-hook comprising:

a long finger having one upper end connected to the first one bend portion and sloped downwardly at a predetermined obtuse-angle relative to the retainer first wire-length, a short finger having one upper end connected to the second bend portion and extending downwardly at a right-angle relative to the second wire-length, wherein said long and short fingers defining with said wire lengths a substantially common plane;

said long finger other lower end terminating in a first acute-angle bend juncture connected to a proximate end of a lead-in wire segment upwardly sloped at a relatively steep incline defining a first acute-angle relative to said long finger, said short finger other lower end terminating in a second acute angle bend juncture connected to a proximate end of a lead-out wire segment upwardly sloped at a relatively flat incline defining a second acute-angle relative to said short finger;

said lead-in and lead-out segments having distal ends interconnected by substantially right-angle bends to associated ends of a bight segment disposed parallel to the retainer axis of rotation;

whereby upon the hinged member being moved downward for engagement of said hook with the anchor member slot, a bottom portion of said lead-in segment smoothly sliding on the fixed member causing said hook to rotate about the axis of rotation away from the anchor member until said bight segment has cleared an upper free edge of the anchor member slot, wherein torsion spring means biasing said hook through the slot such that said bight segment is urged by said spring means into contact with the anchor member; and whereby upon means connected to the retainer rotating said hook and moving the hinged member upward for unlatching said hook, wherein an upper portion of said lead-out segment cams said bight segment past the slot free edge obviating hang up therewith.

2. The latch wire retainer as set forth in claim 1 wherein said second bend juncture defining an acute-angle almost twice said first bend juncture acute-angle.

3. The latch wire retainer as set forth in claim 2 wherein said first bend juncture defining an acute-angle of the order of 50 degrees, said second bend juncture defining an acute angle of the order of 80 degrees, and said long finger predetermined obtuse-angle of the order of 130 degrees.

4. A wire-hook latching and unlatching arrangement for a hinged member pivotable about a transverse hinge axis, the member supporting a latch wire retainer formed with a wire-hook for snap-action engagement with a fixed anchor member having a top wall terminating in a back wall formed with a latch slot, the slot having an upper border defined by a top wall downturned transverse lip free edge, the retainer pivotally mounted on the member for movement about a transverse pivot axis defined by first and second wire-lengths terminating in spaced apart opposed first and second wire-length bend portions interconnected by the hook, spring means biasing the hook in a forward rotational direction about said retainer pivot axis whereby said hook is lockingly received through the slot, an improved wire-hook comprising:

a long finger having one end connected to a first wire-length bend portion and sloped downwardly at a predetermined obtuse-angle relative to the first wire length, a short finger having one end connected to a second wire-length opposed spaced apart bend portion and extending downwardly at a right-angle relative to the second wire length, wherein said long and short fingers substantially defining a common plane with said wire lengths;

said long finger having its other end terminating in a first acute-angled bend juncture connected to a proximate end of a lead-in wire segment upwardly sloped at a relatively steep incline at a first acute-angle relative to said long finger, said short finger having its other lower end terminating in a second acute-angle bend juncture connected to a proximate end of a lead-out wire segment upwardly sloped at a relatively flat incline at a second acute-angle relative to said short finger, and wherein said second bend juncture defining an acute-angle almost twice said first bend juncture acute-angle, said lead-in and lead-out segments having distal ends interconnected by a bight segment defining an axis parallel to the retainer axis;

whereby upon the member being moved downward for engagement of said hook with the slot, a lower portion of said lead-in segment contacting a horizontal exterior surface of the anchor top wall causing said hook to freely rotate aft of the anchor member until said bight segment has cleared the slot free edge wherein said hook is biased forwardly through the slot with an upper portion of said bight segment urged into contact with an undersurface of the anchor top wall; and whereby upon means connected to the retainer rotating said hook and moving the member upward for disengagement-engagement of said hook, wherein an upper portion of said lead-out segment cams said bight segment over the lip free edge obviating hang up therewith.

5. The latching arrangement as set forth in claim 4 wherein said first predetermined acute-angle of the order of 50 degrees, said second predetermined acute angle of the order of 80 degrees and said long finger predetermined obtuse-angle of the order of 130 degrees.

6. The latching arrangement as set forth in claim 4 wherein the member comprising a seat cushion hinged to a vehicle body floor, a pull-strap attached to a wire loop formed at an outboard end of the retainer first wire length, said pull-strap adapted for unlatching of said wire-hook from the floor mounted anchor by rotational movement of said seat cushion about the hinge axis from a seating position to a forwardly tipped overcenter position by an upward pull thereon.

* * * * *